US007994902B2

(12) United States Patent
Avery et al.

(10) Patent No.: US 7,994,902 B2
(45) Date of Patent: Aug. 9, 2011

(54) COOPERATIVE SENSOR-SHARING VEHICLE TRAFFIC SAFETY SYSTEM

(75) Inventors: Paul A. Avery, San Antonio, TX (US); Joshua J. Curtis, San Antonio, TX (US); Reda Laurent Bouraoui, Versailles (FR)

(73) Assignee: Southwest Research Institute, San Antonio, TX (US)

( * ) Notice: Subject to any disclaimer, the term of this patent is extended or adjusted under 35 U.S.C. 154(b) by 285 days.

(21) Appl. No.: 12/392,753

(22) Filed: Feb. 25, 2009

(65) Prior Publication Data

US 2010/0214085 A1 Aug. 26, 2010

(51) Int. Cl.
*B60Q 1/00* (2006.01)

(52) U.S. Cl. ........ 340/435; 340/436; 340/903; 701/213; 701/301

(58) Field of Classification Search .................. 340/435, 340/436, 903, 904, 905; 701/300, 301, 213
See application file for complete search history.

(56) References Cited

U.S. PATENT DOCUMENTS

| | | | | |
|---|---|---|---|---|
| 7,382,274 | B1 * | 6/2008 | Kermani et al. | 340/901 |
| 7,444,240 | B2 * | 10/2008 | Macneille et al. | 701/300 |
| 2010/0198513 | A1 * | 8/2010 | Zeng et al. | 701/300 |

* cited by examiner

*Primary Examiner* — Toan N Pham
(74) *Attorney, Agent, or Firm* — Ann C. Livingston

(57) ABSTRACT

A method and system for using vehicle-to-vehicle cooperative communications for traffic collision avoidance. One vehicle detects a “situation”, such as a pedestrian within the crosswalk, where an “offending object” is in or near a roadway feature, which could result in a collision. The detecting vehicle informs a second vehicle via wireless communications, of the detecting vehicle’s GPS location, the GPS location of the detected object, and the GPS location of the roadway feature, i.e., a crosswalk boundary. Additional data about the “offending object” can include its speed and heading. A receiving vehicle receives this data and takes appropriate avoidance action.

6 Claims, 2 Drawing Sheets

COOPERATIVE SENSOR-SHARING VEHICLE TRAFFIC SAFETY SYSTEM

TECHNICAL FIELD OF THE INVENTION

This invention relates to intelligent transportation systems, and more particularly to vehicles equipped with situational awareness sensing devices and having cooperative communications capability.

BACKGROUND OF THE INVENTION

Today's motor vehicles can be equipped with various safety sensors, including for example, long range scanning sensors for adaptive cruise control, forward sensors for object detection, mid-range blind spot detection sensors, and long-range lane change assist sensors. More recently, sensors such as these have been integrated with on-board control units to provide traffic intelligence.

V2V (vehicle to vehicle) communications is an automobile technology designed to allow automobiles to "talk" to each other. Using V2V communication, vehicles equipped with appropriate sensors, processing hardware and software, an antenna, and GPS (Global Positioning System) technology can trade traffic data. Cars can locate each other, and can determine the location of other vehicles, whether in blind spots, blocked by other vehicles, or otherwise hidden from view.

The term "vehicle telematics" is another term used to define technologies for interchanging real-time data among vehicles. The field of vehicle telematics is quite broad, and when applied for traffic safety, is used in conjunction with standardized vehicle-to-vehicle, infrastructure-to-vehicle, and vehicle-to-infrastructure real-time Dedicated Short Range Communication (DSRC) systems. This permits instantaneous cognizance of a vehicle to be transmitted in real-time to surrounding vehicles or to a remote monitoring station.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to sharing information among vehicles, using wireless communications, for enhanced situational awareness. The methods and system use sensing, communication, and command and control hardware installed in "detecting" and "receiving" modes. On-board computer processing hardware is programmed with algorithms that implement the methods described below.

For purposes of example, the specific traffic safety scenario is pedestrian protection at a crosswalk. In the example of this description, a detecting vehicle detects a pedestrian in a crosswalk and communicates this information to a receiving vehicle that cannot "see" the pedestrian, either because this vehicle is not equipped with sensing hardware, or because the view of the pedestrian is occluded. However, the same concepts of detecting and communicating are applicable to any situation in which a detecting vehicle senses traffic data (i.e., an object in or proximate to a roadway) that has safety implications to the travel of other receiving vehicles.

Sharing data among vehicles is fundamentally a simple task; however, the challenge is to share context-specific information that is relevant to the receiving vehicle. This becomes even more important with the concept of Dedicated Short Range Communications (DSRC) vehicle-to-vehicle (V2V) communications, which must happen quickly, and may contain safety-critical information that must be acted upon quickly. Extraneous data that must be filtered, or bandwidth-intensive data that causes communications delay, will adversely affect the performance of safety systems. Thus, a challenge in such a system is to determine what situations are to be detected, what the relevant data of each situation is, and what the appropriate action is by the receiving vehicle.

Figure 1:
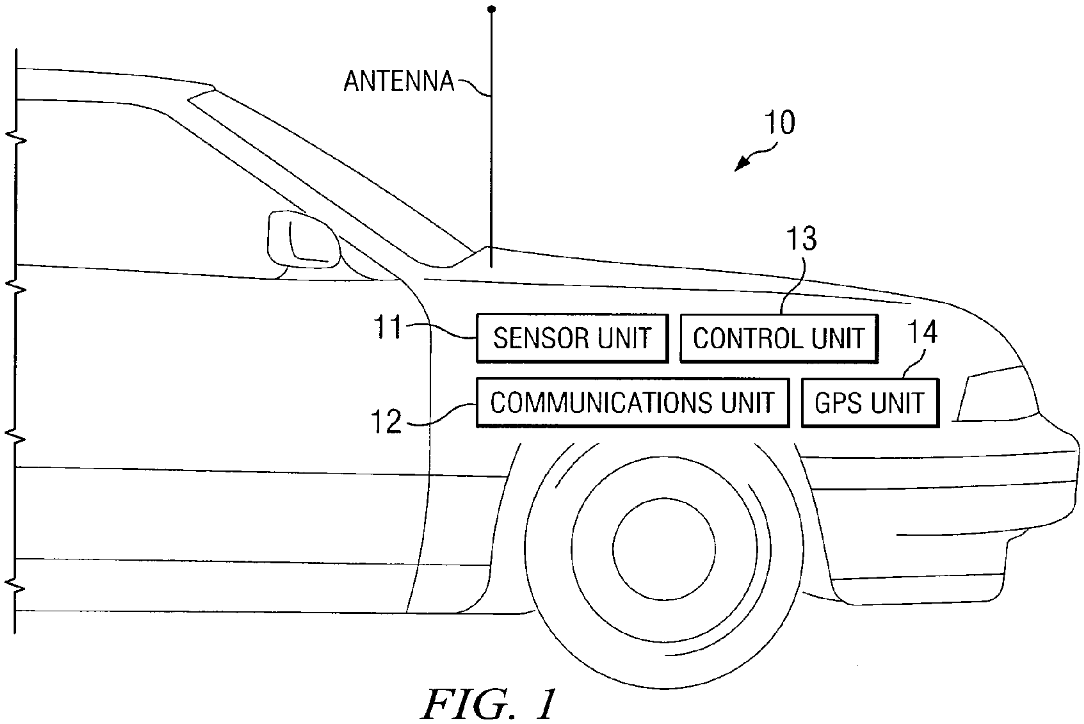
FIG. 1 illustrates an automotive vehicle equipped for cooperative sensor sharing in accordance with the invention.

FIG. 1 illustrates a vehicle 10 equipped for operation in accordance with the invention. In the example of FIG. 1, vehicle 10 is equipped to be capable of both "detecting" and "receiving" modes, and thus, in a given traffic situation, can perform either role. However, in practice, any one vehicle may be equipped with or without an on-board sensor unit 11, such that it may be like vehicle 10 or may be capable of receiving mode only. For the system described herein, collision avoidance is achieved with at least one detecting vehicle (with sensor unit 11) and one receiving vehicle (with or without sensor unit 11). As the system grows in the number of participating vehicles, and especially in the number of detection-capable vehicles, the cooperative sensor-sharing benefits of the system increase accordingly.

Sensor unit 11 comprises one or more "traffic safety sensors" for detecting traffic objects or conditions. Examples of suitable sensors are LIDAR (laser incident detection and ranging), radar, and various vision (camera-based) sensors. Communications unit 12 can be implemented with wifi, cellular, or DSRC (Dedicated Short Range Communications).

Control unit 13 has appropriate hardware and programming to implement the methods discussed herein. As explained below, the detection programming processes and fuses sensor data, evaluates the relevance of the data for specific scenarios, and communicates relevant data to other vehicles. The receiving programming evaluates incoming messages for relevance and determines what action, if any, to take in response.

The control unit 13 further has memory for storing information about the roadway upon which the vehicle is traveling. As explained below, this permits a detecting vehicle to access and deliver data about the GPS location of a roadway feature that is relevant to collision avoidance.

Examples of responses can range from simply alerting the driver, to fully autonomous control of the vehicle to stop or otherwise modify its trajectory. For autonomous control, control unit 13 may be equipped with speed and steering control signal generators. Each vehicle is also equipped with a GPS unit 14.

Figure 2:
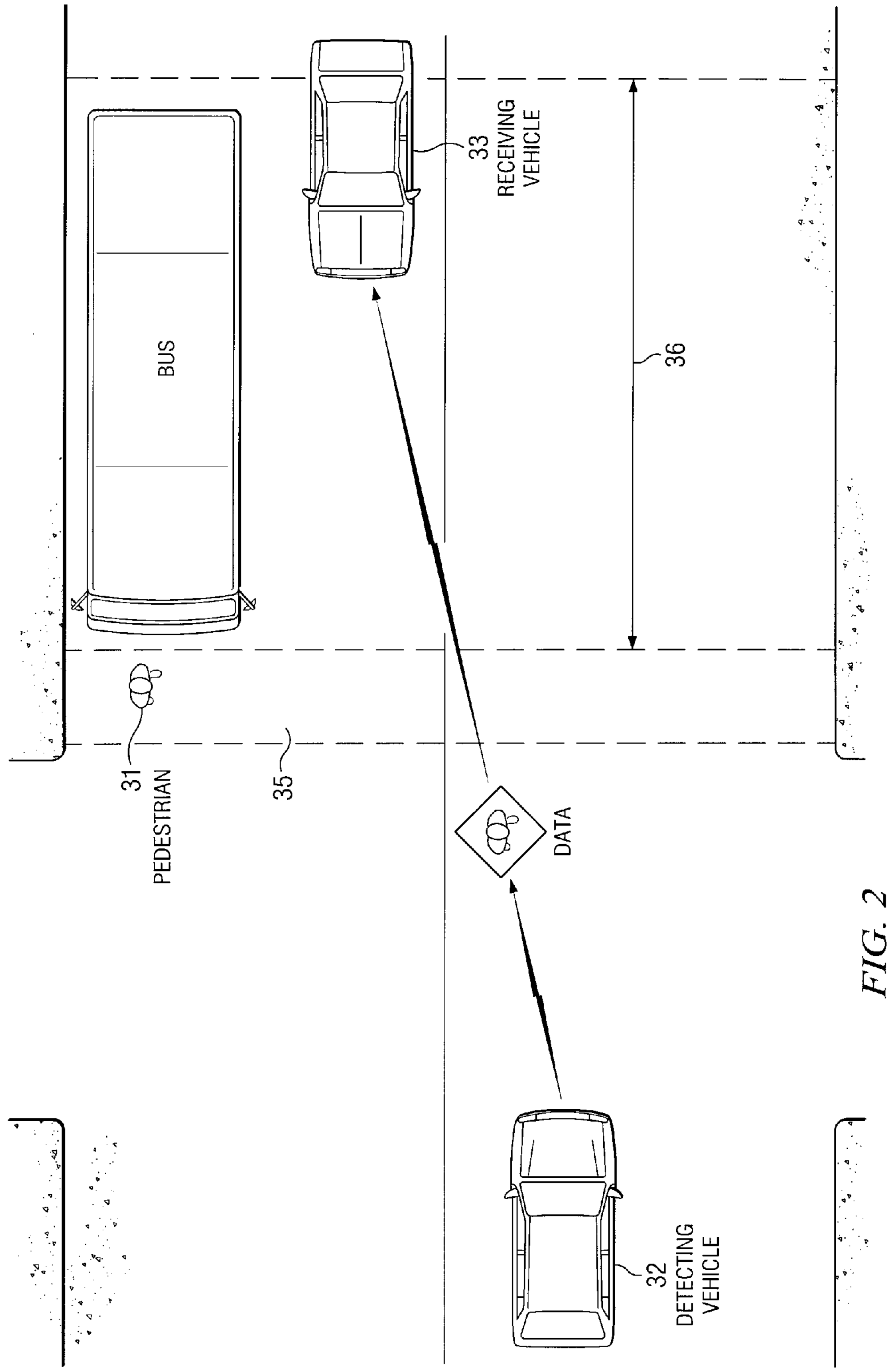
FIG. 2 illustrates an example of a situation in which cooperative sensor sharing is used to avoid a crosswalk traffic accident.

FIG. 2 illustrates an example of one situation in which V2V sensor-sharing information can avoid an accident. The scenario is that of a pedestrian 31 crossing a crosswalk when it "shouldn't be", such as if the cross-traffic has a green light. As explained below, a detecting vehicle 32 detects the pedestrian and delivers warning data to a receiving vehicle 33, which cannot "see" the pedestrian.

The detecting vehicle 32 combines several independent pieces of information that have either been collected directly from sensors, or have been provided as a priori information. The key aspect to detection of a situation is the temporal combination ("fusion") of independent sources of specific information.

In this case, the location of the pedestrian 31 is detected in a relative coordinate system to the detecting Vehicle 32 using a sensor unit 11 having a LIDAR sensor. This information, however, is only relevant to the detecting vehicle 32, and does not provide a high level of confidence that the detected object is a pedestrian, rather than something like a car, tree, or fire hydrant. Two additional pieces of information are used to locate the object within a global reference frame and to increase the confidence level for classification of the object as a pedestrian: the GPS location of the detecting vehicle and the GPS location of the crosswalk. The GPS crosswalk location data typically includes at least two diagonally opposing corners and a point representing the separation of lane directions, "direction divide". This data is stored in memory of the control unit 13 of the detecting vehicle.

Additional characteristics of the detected object 31 can be used to increase the confidence that the object is a pedestrian, such as size, velocity, and heading. However, using only LIDAR sensing, a pedestrian could be standing still in the crosswalk and would be difficult to discern from something like a traffic barrel. Thus, the assumption is made that if an object of a certain size is detected within the polygon of the crosswalk, regardless of its velocity, it must be considered a pedestrian unless additional sensor data, such as an onboard camera, contradicts this conclusion.

The GPS locations of the crosswalk boundary and of the detecting vehicle 32 allow the relative position of the pedestrian 31 to be transformed into a global location. These data then become the key pieces of information that are transmitted to the receiving vehicle, using communications unit 12: GPS locations of sending vehicle, pedestrian, and crosswalk boundary. Additional information is also sent, such as the pedestrian's velocity and heading, and a data timestamp.

The receiving vehicle's communications unit 12 receives the incoming data. Its control unit 13 is programmed to give the receiving vehicle 33 more or less reactive behaviors to the incoming information. For example, if the pedestrian 31 is headed away from the projected path of the receiving vehicle 33, the vehicle may slow somewhat, but will essentially continue on its path. A more reactive behavior is to slow and stop the vehicle at the edge of the crosswalk regardless of the pedestrian's position, speed, or heading.

The receiving vehicle 33 must be able to intelligently evaluate the incoming information for relevance. In this crosswalk situation, the most important piece of information from the detecting vehicle 32 is the location of the pedestrian in a reference frame that is shared between the two vehicles. In this case, the GPS latitude/longitude reference frame was chosen.

The receiving vehicle 33 must determine whether there is a collision risk with the pedestrian, which can be done by evaluating the spatial and temporal relationship between the current GPS positions of the detecting vehicle 32 and pedestrian 31, and the future paths of both the receiving vehicle and the pedestrian. If the paths do not intersect, then the message can be ignored.

If the paths do intersect, the receiving vehicle 33 must take appropriate action. This action is context-specific, but in the context of a non-hostile, urban, trafficked environment, the appropriate action is to avoid a collision with the pedestrian. Although maneuvering around the pedestrian is possible in theory, pedestrians are unpredictable and dynamic objects and must be treated accordingly. Thus, if the receiving vehicle 33 is sufficiently close to the pedestrian, the most appropriate action to avoid a collision is to stop before the two paths intersect. However, if the pedestrian and crosswalk are sufficiently far away where a sudden stop would be unnecessary and unnatural to the human observer, then the appropriate action is to ignore the message.

FIG. 2 also illustrates the use of timing zones for determining the response of the receiving vehicle 33. As long as a pedestrian is present in a predefined crosswalk path 35, the detecting vehicle 32 continues to send a data packet with the above-described information. If the receiving vehicle 33 is within a certain distance 36 from the crosswalk path 35, a threshold that will vary by vehicle weight and speed (used to calculate a vehicle stopping distance), the receiving vehicle will stop.

The above methods may be developed on different platforms, using different sensing and communication hardware, for different traffic environments. However, the method is the same: one vehicle detects a "situation", i.e., a pedestrian within the crosswalk. The detecting vehicle informs a second vehicle via wireless communications, of the detecting vehicle's GPS location, the GPS location of the detected object, and the GPS location of a road feature, i.e., a crosswalk boundary. Additional data about the "offending object", i.e., the pedestrian, can include its speed and heading. The second vehicle reacts appropriately to avoid a collision.

The GPS location of the "road feature" is a priori, in the sense that it is already known and may be stored (or otherwise made available) as data accessible by the detecting vehicle. Other examples of roadway features that could be communicated in accordance with the invention are blind spots, bicycle lanes, school zones, and other lanes of traffic at an intersection.

Figure 3:
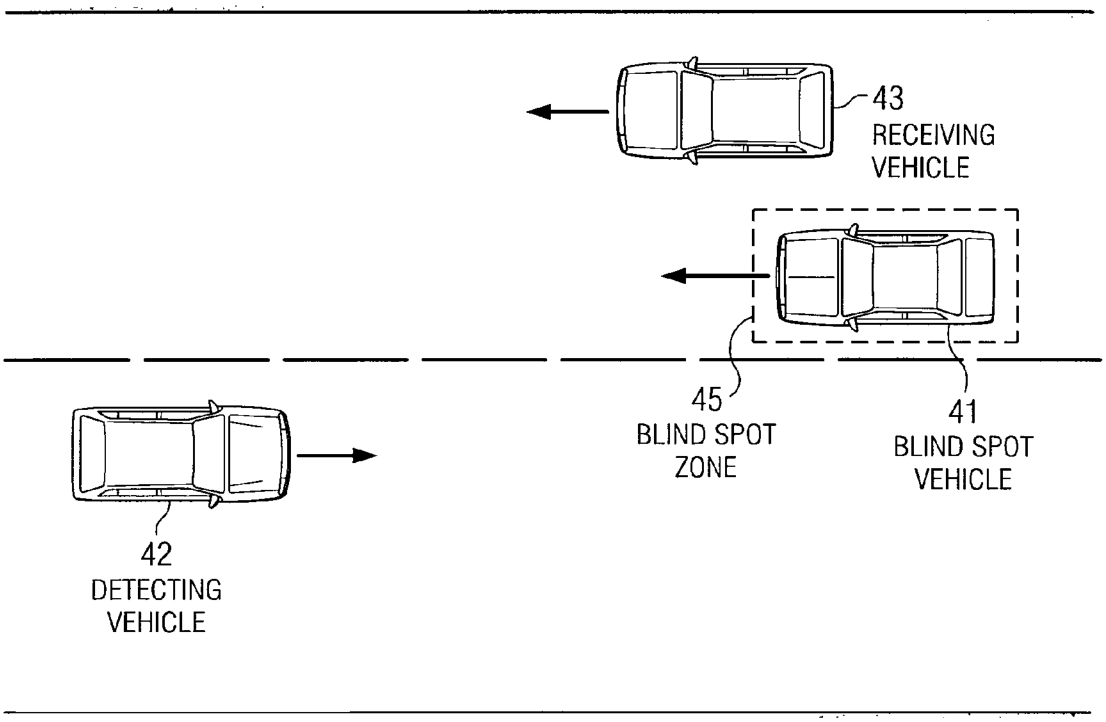
FIG. 3 illustrates an example of a situation in which cooperative sensor sharing is used to avoid a blind spot traffic accident.

FIG. 3 illustrates a second example of collision avoidance using V2V cooperative communications. In this example, the detecting vehicle 42 detects a vehicle 41 in the "blind spot" of the receiving vehicle 43 . In other words, two vehicles in a predetermined relative position to each other have been detected. The detecting vehicle sends its own GPS location, the location of the offending vehicle 41 , the location of the blind spot to the receiving vehicle 43. The receiving vehicle 43 can then evaluate this data, and warn the driver or take other action. The road feature is the a priori location of the roadway that currently is the receiving vehicle's blind spot.

As a third example, at an intersection, a detecting vehicle could detect an "offending vehicle" about to run a red light. The detecting vehicle would then send a warning message to other vehicles in the vicinity. In this situation, the communicated data would be the GPS location of the detecting vehicle, the GPS location of the offending vehicle, and a priori intersection data. The intersection data could include information such as the GPS location of the center of the intersection and of each lane where it enters the intersection, as well as other information, such as the direction of travel for each lane. For this situation, where the road feature is an intersection, data is being defined within SAE standards for signal phase and timing, and this data can be made available to the participating vehicles. Additional data representing the speed and heading of the offending vehicle may also be sent.

What is claimed is:

1. A method of cooperatively sharing traffic safety sensor data between vehicles for avoidance of a pedestrian-vehicle collision in a crosswalk, comprising:

using a detection sensor of a detecting vehicle to detect a pedestrian in or proximate to the crosswalk;

determining a relative position of the pedestrian in a coordinate system relative to the detecting vehicle;

using GPS equipment of the detecting vehicle to determine at least a GPS location of the detecting vehicle;

accessing data stored in memory of the detecting vehicle to determine GPS crosswalk boundary data;

using the GPS crosswalk boundary data and the GPS location of the detecting vehicle to determine a global location of the pedestrian;

defining a crosswalk path of the pedestrian;

using communications equipment of the detecting vehicle, communicating the following data to a receiving vehicle; the GPS location of the detecting vehicle, the GPS crosswalk boundary data, and the global position of the pedestrian;

repeating the communicating step for as long as the pedestrian is in the crosswalk path;

using communications equipment of the receiving vehicle to receive the data; and using processing equipment of the receiving vehicle to evaluate the relevance of the data to collision avoidance between the receiving vehicle and the pedestrian.

2. The method of claim 1, wherein the detection sensor is a LIDAR sensor.

3. The method of claim 1, wherein the detection sensor is a vision sensor.

4. The method of claim 1, wherein the communications units of the detecting vehicle and the receiving vehicle are implemented with the Dedicated Short Range Communications standard.

5. The method of claim 1, wherein the detecting vehicle further determines and communicates the pedestrian's velocity and heading.

6. The method of claim 1, wherein the detecting vehicle further communicates a timestamp.

* * * * *